United States Patent
Iinuma

(10) Patent No.: US 9,165,226 B2
(45) Date of Patent: Oct. 20, 2015

(54) IMAGE PROCESSING APPARATUS, METHOD, AND STORAGE MEDIUM FOR EXECUTING IMAGE PROCESSING AND PERFORMING DECORATION PROCESSING

(71) Applicant: CANON KABUSHIKI KAISHA, Tokyo (JP)

(72) Inventor: Osamu Iinuma, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/080,526

(22) Filed: Nov. 14, 2013

(65) Prior Publication Data

US 2014/0139884 A1    May 22, 2014

(30) Foreign Application Priority Data

Nov. 16, 2012  (JP) .................................. 2012-251882

(51) Int. Cl.
  *G06K 15/00* (2006.01)
  *H04N 1/40* (2006.01)
  *G06K 15/02* (2006.01)
  *H04N 1/60* (2006.01)
  *H04N 1/46* (2006.01)
  *H04N 1/54* (2006.01)

(52) U.S. Cl.
  CPC ........ *G06K 15/1868* (2013.01); *H04N 1/40012* (2013.01); *H04N 1/6072* (2013.01); *H04N 1/465* (2013.01); *H04N 1/54* (2013.01)

(58) Field of Classification Search
  USPC .................. 382/192, 194, 221, 271
  See application file for complete search history.

(56) References Cited

U.S. PATENT DOCUMENTS

| | | | | |
|---|---|---|---|---|
| 6,179,485 | B1 * | 1/2001 | Harrington | 358/1.9 |
| 6,600,832 | B1 * | 7/2003 | Nakayama et al. | 382/162 |
| 7,110,147 | B1 * | 9/2006 | Hayama et al. | 358/464 |
| 2003/0053094 | A1 * | 3/2003 | Ohga et al. | 358/1.9 |
| 2009/0180164 | A1 * | 7/2009 | Miyagi | 358/518 |
| 2011/0141501 | A1 * | 6/2011 | Shirata | 358/1.9 |
| 2013/0044949 | A1 * | 2/2013 | Ono | 382/167 |

FOREIGN PATENT DOCUMENTS

| | | | |
|---|---|---|---|
| JP | 2008-244619 A | | 10/2008 |
| JP | 2008244619 A | * | 10/2008 |
| JP | 2009140431 A | * | 6/2009 |

OTHER PUBLICATIONS

Japanese Patent Office Machine Translation of JP2009140431 A and JP2008244619A.*

* cited by examiner

*Primary Examiner* — Richard Zhu
(74) *Attorney, Agent, or Firm* — Canon USA Inc. IP Division

(57) ABSTRACT

An image processing apparatus which decorates color data contained in color image data with different decoration patterns for respective colors of the color data to output the color data includes a determination unit which determines a combination of a color of color data having a highest number of pixels among colors of color data contained in the color image data and a decoration pattern having a lowest number of pixels among the decoration patterns and a monochrome decoration output unit which decorates color data contained in the color image data in accordance with a combination of a color and a decoration pattern corresponding to the color determined by the determination unit for monochrome decoration output of the color image data.

6 Claims, 12 Drawing Sheets

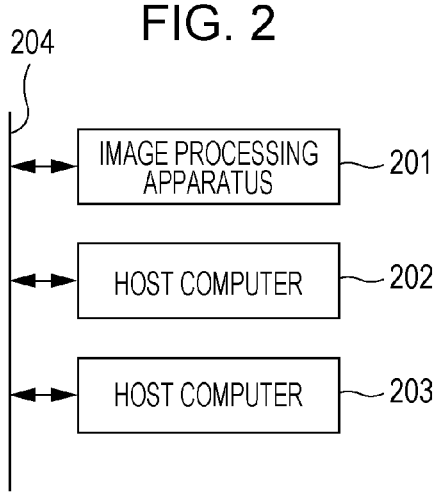
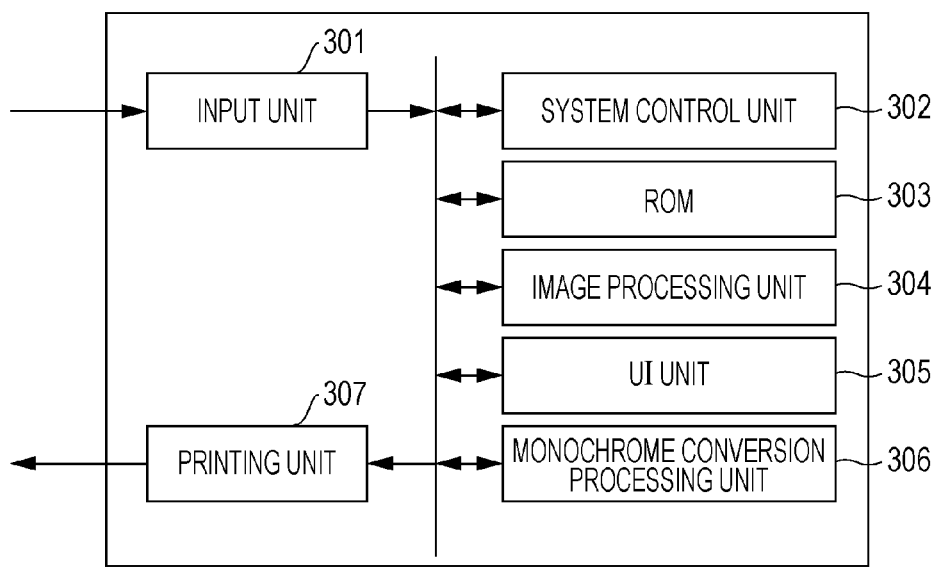

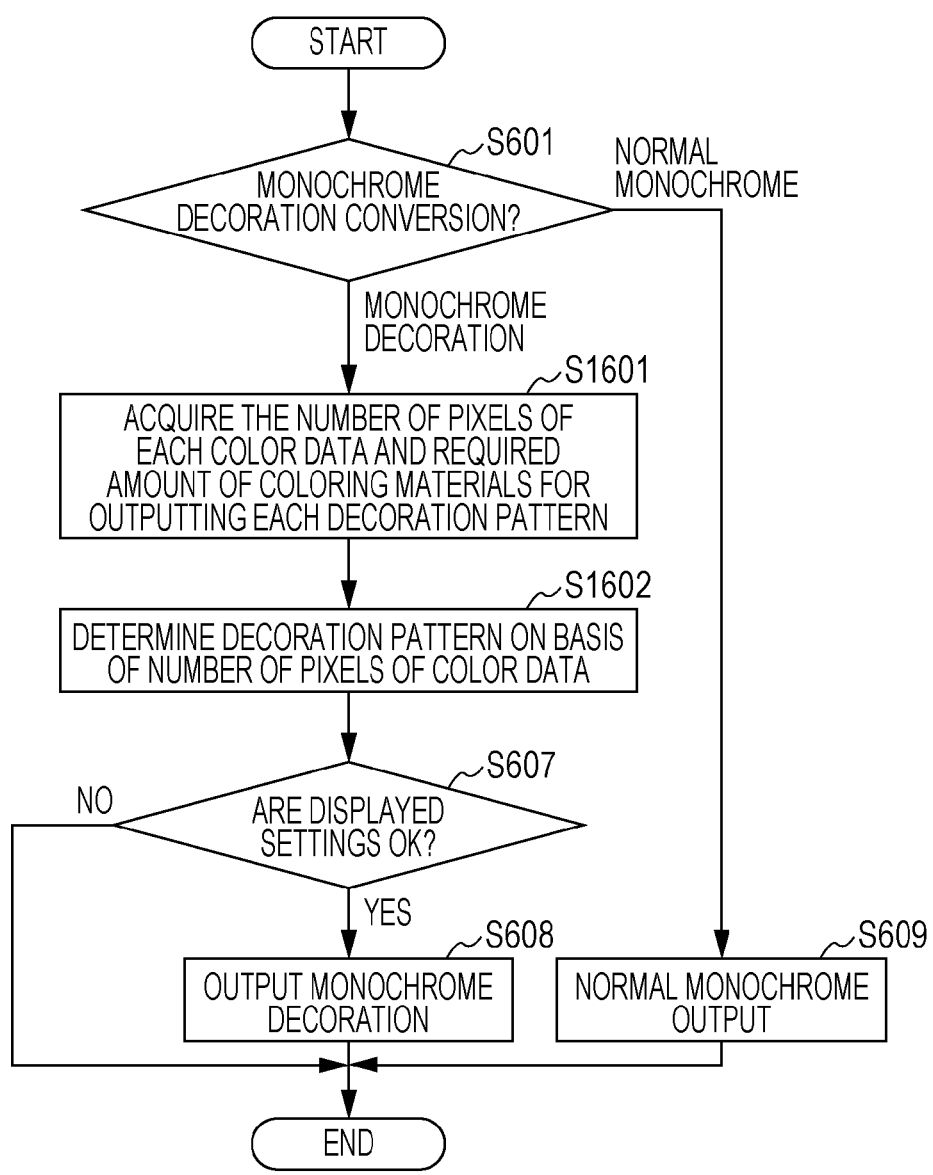

IMAGE PROCESSING APPARATUS, METHOD, AND STORAGE MEDIUM FOR EXECUTING IMAGE PROCESSING AND PERFORMING DECORATION PROCESSING

BACKGROUND OF THE INVENTION

1. Field of the Invention

The present disclosure generally relates to image processing and, more particularly, to an image processing apparatus, an image processing method and a storage medium storing a program for executing image processing in which decoration processing is performed on color text to print for monochrome output of a color document from an image processing apparatus.

2. Description of the Related Art

FIG. 1 illustrates a color document 101 including text 102 output in black, text 103 output in red, and text 104 output in blue.

Color image data acquired from the input color document 101 is gray-scale converted and is monochromatically output in black (hereinafter, called monochrome output (copy or page description language (PDL) printing)), resulting in a monochrome output material 105.

In the monochrome output material 105, the text 102 originally output in black, the text 103 originally output in red and the text 104 originally output in blue on the color document 101 are difficult to distinguish. In general, a document creator may often put color emphasis on text of an important part in a document. However, the important part with color emphasis may be output in monochrome. Possibly in this case, which part of the document is important is not noticeable for a user who has received the document from the document creator.

Against this problem, according to Japanese Patent Laid-Open No. 2008-244619, for monochrome output of color image data, a decoration having an equal color density to that of text to be originally output in a color excluding black may be given around the text to output a resulting output material 106 (hereinafter, called a monochrome decoration output material). Alternatively, a decoration may be given to text itself which should be originally output in a color excluding black to output a monochrome decoration output material 106. Thus, information describing that the subject text is important may be inherited from the color image data. For example, the text 102 output in black on a color document results in text 107 in black as it is while the text 103 output in red on the color document is converted to text 108 decorated with a black underline. The text 104 output in blue on the color document is converted to black bold text 109.

Thus, in monochrome decoration output processing, decorations having different patterns for colors may be given to inherit information that the colors have been output in different colors on a color document.

However, in the monochrome decoration output processing, a more amount of a coloring material may possibly be consumed than that in normal monochrome output processing.

SUMMARY OF THE INVENTION

An image processing apparatus according to the present disclosure which decorates color data contained in color image data with different decoration patterns for respective colors of the color data to output the color data includes a determination unit which determines a combination of a color of color data having a highest number of pixels among colors of color data contained in the color image data and a decoration pattern having a lowest number of pixels among the decoration patterns and a monochrome decoration output unit which decorates color data contained in the color image data in accordance with a combination of a color and a decoration pattern corresponding to the color determined by the determination unit for monochrome decoration output of the color image data.

According to the present disclosure, monochrome decoration patterns corresponding to colors may be selected based on an amount of coloring material used for monochrome decoration output. This may inhibit an increase of the amount of coloring material in monochrome decoration output processing from that in normal monochrome output processing.

Further features of the present disclosure will become apparent from the following description of exemplary embodiments with reference to the attached drawings.

BRIEF DESCRIPTION OF THE DRAWINGS

FIG. 2 is a configuration diagram illustrating an overview.

FIG. 3 is a block diagram illustrating a system configuration.

FIG. 16 is a flowchart illustrating an outline of the first embodiment.

DESCRIPTION OF THE EMBODIMENTS

Figure 1:
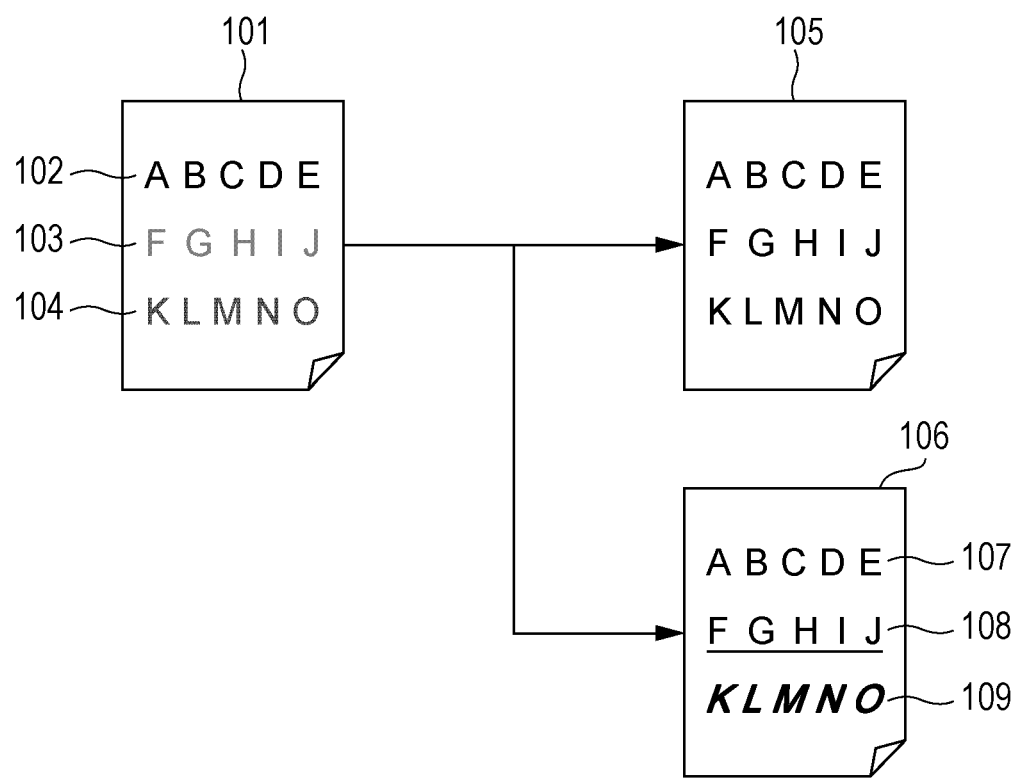
FIG. 1 illustrates a difference between normal monochrome output processing and monochrome decoration output processing.

Various exemplary embodiments, features, and aspects of the disclosure will be described in detail below with reference to the drawings.

First Embodiment

First, control in monochrome decoration output processing will be described.

Normal Monochrome Output and Monochrome Decoration Output

In normal monochrome output processing (hereinafter, called normal monochrome processing), color image data acquired by reading a color document 101 is converted to a gray-scale image, and the data of the gray-scale converted image is output. On the other hand, in monochrome decoration output processing, color text (color text data) instructed to output by using color material is extracted from color image data, and the extracted color text data is gray-scale converted. A decoration having an equal color density to that of the gray-scale converted text data is given to the text data itself or around the text data, and the decorated text data is output in monochrome. In the monochrome decoration output processing, data excluding the color text data extracted from color image data is also gray-scale converted and is output in the same manner as that in the normal monochrome output processing.

The "color material" may refer to cyan, magenta, yellow (C, M, Y) toner or specific toner, ink or the like, for example.

It is assumed that monochrome output and monochrome decoration output in the following description use a black coloring material. However, because use of a single coloring material for output may only be necessary, a single coloring material excluding a black coloring material may be used for monochrome output and monochrome decoration output.

Overview of General Configuration

FIG. 2 illustrates a configuration diagram involving an image processing apparatus 201, a host computer 202, and a host computer 203 configured to implement monochrome decoration output.

Over a network 204, the image processing apparatus 201 executes an output process in response to an output instruction from the host computer 202 or host computer 203 in which a printer driver for the image processing apparatus 201 is installed. Image data read by an image reading apparatus (not illustrated) in the image processing apparatus 201 may be transmitted to the host computer 202 or host computer 203. Use of a printing unit 307 in the image processing apparatus 201 allows a copy operation which outputs image data read by the reading apparatus.

This embodiment assumes that an instruction is transmitted from the host computer 202 or 203 to the image processing apparatus 201 and the image processing apparatus 201 performs printing in accordance with the transmitted instruction, but the present disclosure is not limited thereto. For example, the present disclosure covers a copy operation which outputs image data read by an attached image reading apparatus.

Methods for Monochrome Decoration Output and Monochrome Decoration Guide Output

FIG. 3 illustrates a configuration of the image processing apparatus 201. The image processing apparatus 201 includes an input unit 301, a system control unit 302, a read only memory (ROM) 303, an image processing unit 304, a user interface (UI) unit 305, a monochrome conversion processing unit 306, and a printing unit 307. The system control unit 302 includes a central processing unit (CPU), not illustrated. As used herein, the term "unit" generally refers to any combination of software, firmware, hardware, or other component that is used to effectuate a purpose.

Figure 7:
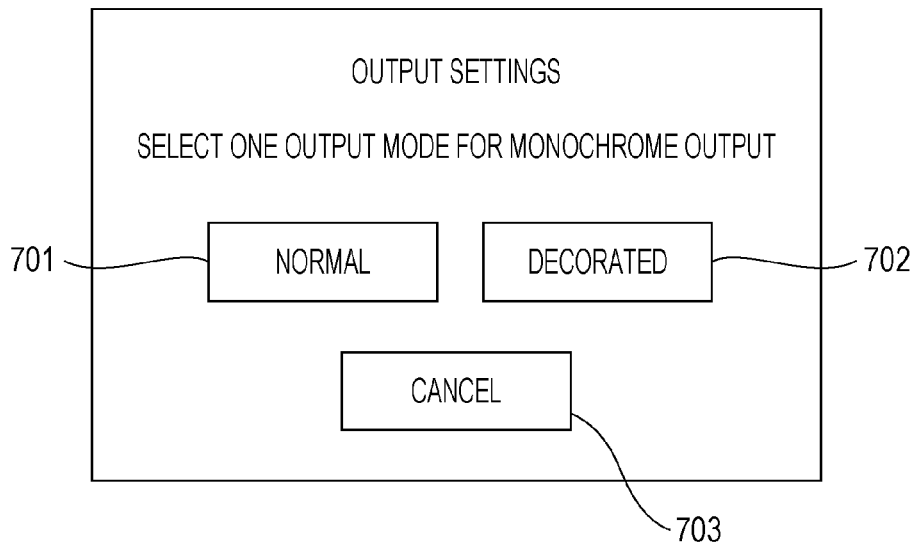
FIG. 7 illustrates an example displayed on a monitor or a user interface (UI) screen.

FIG. 7 illustrates an example of a screen displayed on a monitor (not illustrated) of the host computer 202 or 203 or a display unit of the UI unit 305 in the image processing apparatus 201.

Monochrome decoration output may be set in the following two methods. According to one method, monochrome decoration output is set when settings for printing are defined through the printer driver installed in the host computer 202 or 203.

A screen as illustrated in FIG. 7 is displayed on a monitor of the host computer 202 or 203.

When a button 702 illustrated in FIG. 7 is pressed, a monochrome decoration output process is performed on a subject image. On the other hand, when a button 701 is pressed, normal monochrome output processing is performed on a subject image. When a button 703 is pressed, the monochrome output processing is cancelled.

According to another setting method, the screen illustrated in FIG. 7 and displayed on the UI unit 305 of the image processing apparatus 201 is used to define settings for monochrome decoration output processing or monochrome decoration guide output processing, as performed through the printer driver.

When the two setting methods are available through both of the printer driver and the UI unit 305, the settings through the printer driver may be prioritized. Alternatively, the settings through the printer driver may be prioritized for output while the settings through the UI unit 305 in the image processing apparatus 201 may be prioritized for copy output.

Overview of Monochrome Decoration Output

Overview of a monochrome decoration output process will be described with reference to FIGS. 3, 4, 6, and 8.

Figure 4:
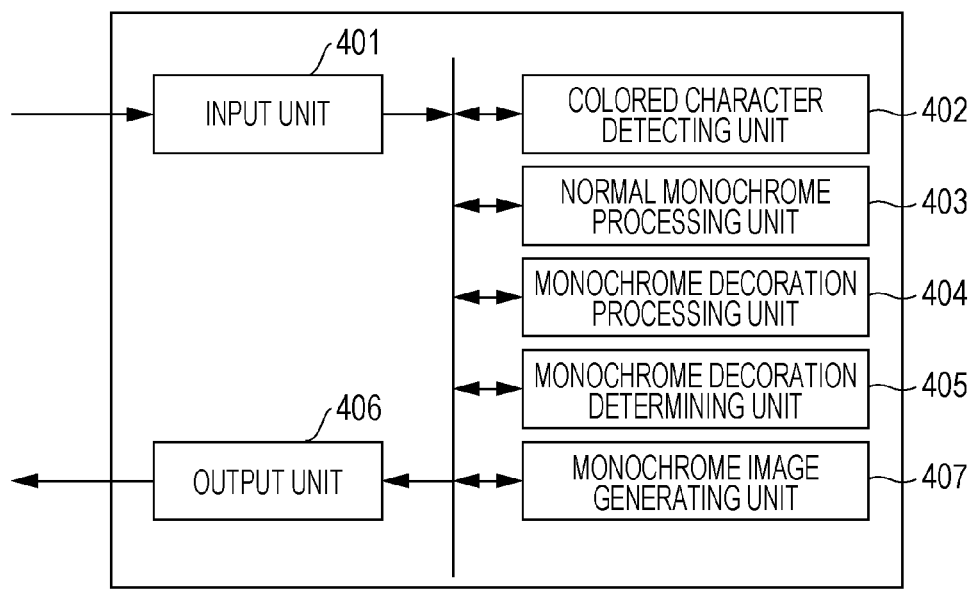
FIG. 4 is a block diagram illustrating monochrome conversion processing unit.

FIG. 4 illustrates a configuration of the monochrome conversion processing unit 306.

The monochrome conversion processing unit 306 includes an input unit 401, a color text detecting unit 402, a normal monochrome processing unit 403, a monochrome decoration processing unit 404, a monochrome decoration determining unit 405, an output unit 406, and a monochrome image creating unit 407.

Figure 6:
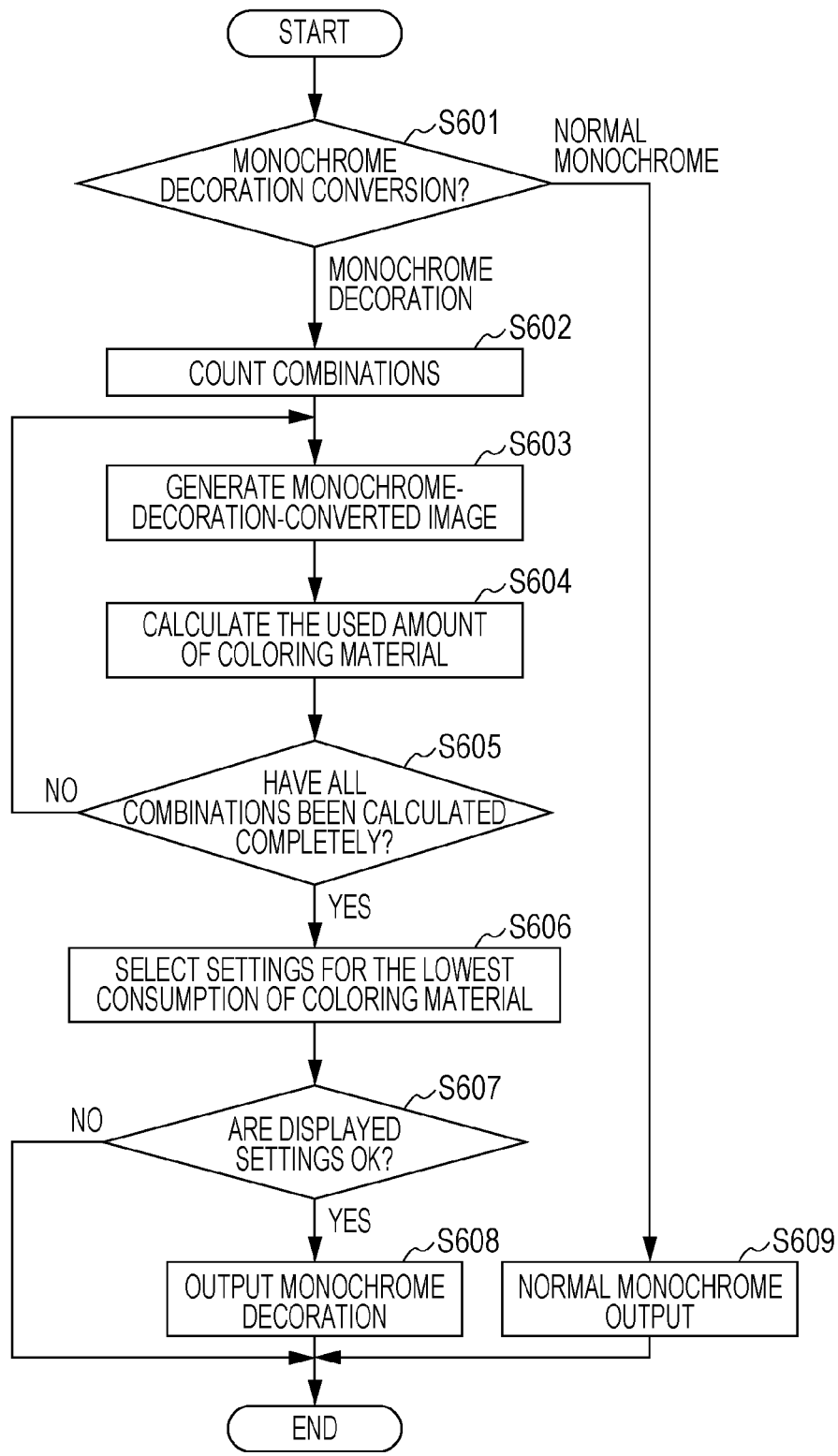
FIG. 6 is a flowchart illustrating an outline of a first embodiment.

FIG. 6 is a flowchart illustrating processes to be performed by the image processing unit 304, monochrome conversion processing unit 306, and monochrome decoration determining unit 405. The steps on the flowchart may be executed by the system control unit 302 in the image processing apparatus 201 in accordance with a program stored in the ROM 303. The system control unit 302 includes a CPU, not illustrated.

Figure 8:
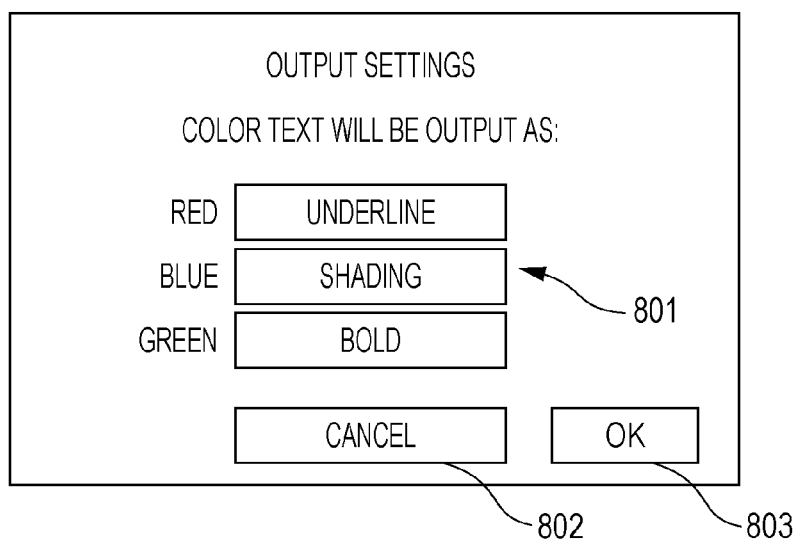
FIG. 8 illustrates an example displayed on a monitor or a UI screen.

FIG. 8 illustrates an example of a screen displayed on a monitor (not illustrated) of the host computer 202 or 203 or a display unit of the UI unit 305 in the image processing apparatus 201.

In step S601 in FIG. 6, the system control unit 302 receives information describing whether the monochrome decoration output processing has been set or not through the UI unit 305 in the image processing apparatus 201 or a monitor of the host computer 202 or 203. The system control unit 302 transmits the received information to the image processing unit 304 and monochrome conversion processing unit 306. The system control unit 302 transmits color image data that is a subject of the processing input from the input unit 301 to the input unit 401 of the monochrome conversion processing unit 306.

Subject color image data which is input to the input unit 301 is image data such as PDL data transmitted from the host computer 202 or 203.

Alternatively, an image read by an image reading apparatus attached to the image processing apparatus 201 may be converted to color image data and be input to the input unit 301.

If the system control unit 302 determines that the monochrome decoration output processing is set in step S601, the processing moves to step S602. In step S602, the color text detecting unit 402 detects what color or colors of color text is or are contained in the color image data.

For example, if the input color image data is PDL data, the number of colors may be detected by analyzing the data.

If the input color image data is data read by an image reading apparatus connected to the image processing apparatus 201, a luminance signal of the read data is acquired, and how many types of color may be classified to predetermined colors is analyzed in accordance with the luminance signal to detect the number of colors.

Then, the number of decoration patterns that may be implemented in the image processing apparatus 201 is acquired.

The number of decoration patterns may be acquired by reading information describing the types of decoration pattern to be used for monochrome decoration output processing and stored in the image processing apparatus 201.

Then, the number of combinations of the number of types of color used for color-outputting the color text detected from the color image data and the number of monochrome decoration patterns that may be implemented in the image processing apparatus 201 is counted. For example, if color text (color text data) is detected which is instructed to output in red, blue, and green in the color image data, three types of decoration pattern are used for decoration with different patterns for colors. This results in six combinations of colors and decoration patterns corresponding to the colors, and therefore the count is equal to 6.

When many types of color are detected and the number of corresponding decoration patterns is not enough for them, monochrome decoration conversion is performed by using decoration patterns for color text in the higher several colors among the highly frequently used colors.

If the count number of combinations of colors and decoration patterns corresponding to the colors is acquired, the processing moves to step S603.

In step S603, the system control unit 302 selects one combination of the combinations counted in step S602 and converts the color image data to be processed to monochrome decoration output image data. Notably, color text (color text data) of color image data is converted to monochrome decoration image data in the monochrome decoration processing unit 404, the details of which will be described below. On the other hand, a part excluding the color text (data excluding color text data) of the color image data is converted to normal monochrome image data in the normal monochrome processing unit 403.

In step S604, the monochrome decoration determining unit 405 acquires and stores a total number of pixels contained in the monochrome decoration image data. If the value is acquired, the relationship between the number of pixels and the amount coloring material used for outputting data having the number of pixels may be expressed as:

the amount of coloring material($g$)=(number of pixels)×$k$ where k is a coefficient and it is assumed that the relationship between the number of pixels and the amount of coloring material is linear.

Thus, when the number of pixels is acquired, the amount of black coloring material used for outputting the monochrome decoration image data may be acquired. Alternatively, instead of the entire monochrome decoration image data, a total number of pixels contained in text data having decorated in monochrome of monochrome decoration image data may only be acquired and be stored. In this case, the amount of black coloring material used for outputting text data having undergone monochrome decoration conversion of monochrome decoration image data may be acquired.

In the same manner, one combination of the combinations of the colors counted in step S602 and the decoration patterns corresponding to the colors is selected in order to convert subject color image data to monochrome decoration image data. Then, a total number of pixels contained in the monochrome decoration image data or a total number of pixels contained in text data decorated in monochrome of the monochrome decoration image data is acquired.

The acquisition of a total number of pixels is repeated. In step S605, the monochrome decoration determining unit 405 determines whether the acquisition of the number of (or the amount of coloring material for) pixels having undergone monochrome decoration image conversion corresponding to all combinations counted in step S602 has completed or not. If not, steps S603 and S604 are repeated. If so, the processing moves to step S606.

It should be noted that the acquisition of the number of (or the amount of coloring material for) pixels of a combination with a predictably high amount of coloring material may be skipped.

In step S606, the monochrome decoration determining unit 405 uses combinations of colors and decoration patterns corresponding to the colors to compare total numbers of pixels acquired by conversion of the color image data to monochrome decoration image data. A combination of a color and a decoration pattern corresponding to the color with the lowest total number of pixels is selected from the acquired combinations. More specifically, a combination with the lowest amount of coloring material used for output is selected. Then, the monochrome decoration image data converted with the selected combination is kept while the monochrome decoration image data converted with the other combinations are deleted.

Next, in step S607, a monitor of the host computer 202 or 203 or the UI unit 305 displays a screen showing the combination selected above. FIG. 8 illustrates an example of the screen. An area 801 of the screen displays settings for colors of the subject text and corresponding monochrome decoration patterns to be used by the conversion. When a button 802 is pressed, the displayed settings are cancelled, and the processing ends. When the button 803 is pressed, it means that a user has confirmed selection of the displayed settings, and the processing moves to step S608. In step S608, the monochrome decoration image data transmitted from the monochrome conversion processing unit 306 is converted to monochrome decoration binary data in the image processing unit 304. The monochrome decoration binary data is transmitted to the printing unit 307, and the transmitted monochrome decoration binary data is output from the printing unit 307. Thus, the input color image data is monochrome-decoration-converted and is output.

Along with the output of monochrome decoration binary data, a sheet (guide print) may be output which shows a combination of colors shown on the screen as in FIG. 8 and decoration patterns corresponding to the colors.

From the output guide print, a user having received an output material from monochrome decoration binary data may be informed of a combination of colors of each subject color image data and decoration patterns corresponding to the colors.

Notably, if it is determined in step S601 that the normal monochrome output processing is selected, the monochrome conversion processing unit 306 and image processing unit 304 creates normal monochrome binary data in step S609. The printing unit 307 having received the normal monochrome binary data outputs normal monochrome binary data.

FIG. 16 illustrates a different flow of processing in step S602 to step S606.

FIG. 16 is a flowchart illustrating processing to be performed in the image processing unit 304, monochrome conversion processing unit 306, and monochrome decoration determining unit 405. The steps on the flowchart are executed by the system control unit 302 in the image processing apparatus 201 in accordance with a program stored in the ROM 303. The system control unit 302 includes a CPU, not illustrated.

Because the steps S601 and S607 and subsequent steps in FIG. 16 are the same as those in the first embodiment, the description will be omitted. In step S1601, color text (color text data) contained in color image data are classified to colors, and the number of pixels of data for each of the colors is acquired.

In this case, the numbers of pixels itself may be acquired, or a proportion of numbers of pixels for the colors may be acquired.

The amount of coloring material used for outputting a decoration pattern to be used for decorating the color text is acquired for each color. The amount of coloring material required for outputting a decoration pattern may be prestored. Instead of the amounts of coloring material, the order of the used amounts of coloring material may be available which indicates the pattern that uses the largest amount of coloring material and the pattern that uses the smallest amount of coloring material.

After the acquisition in step S1601 completes, the processing moves to step S1602.

In step S1602, a color having a lowest number of pixels is detected from the numbers of pixels of color data acquired in step S1601. The decoration pattern corresponding to the color text of the color is determined as a decoration pattern using the largest amount of coloring material when the decoration patterns acquired in S1601 are output.

In the same manner, in step S1602, a color having the highest number of pixels is detected from the numbers of pixels of color data acquired in step S1601. The decoration pattern corresponding to the color text of the color is determined as a decoration pattern using the smallest amount of coloring material when the decoration patterns acquired in S1601 are output.

More specifically, when a combination with the smallest amount of coloring material used for output is selected, color text is monochrome-decoration-converted by which color image data in red, blue, and green using more amounts of coloring material in order are converted to decoration patterns of bold, shading, and underline, the details of which will be described below.

When more amounts of coloring material are used for outputting bold, shading and underline in order, red text, blue text and green text are decorated with underline, shading and bold, respectively.

Thus, a combination of a color and a decoration pattern corresponding to the color using the smallest amount of black coloring material for monochrome decoration output is determined.

After that, the same processing as in step S607 and step S608 described above is performed, and the combination is used to perform monochrome decoration conversion on the color image data.

Image Processing in Monochrome Decoration Output

Figure 9:
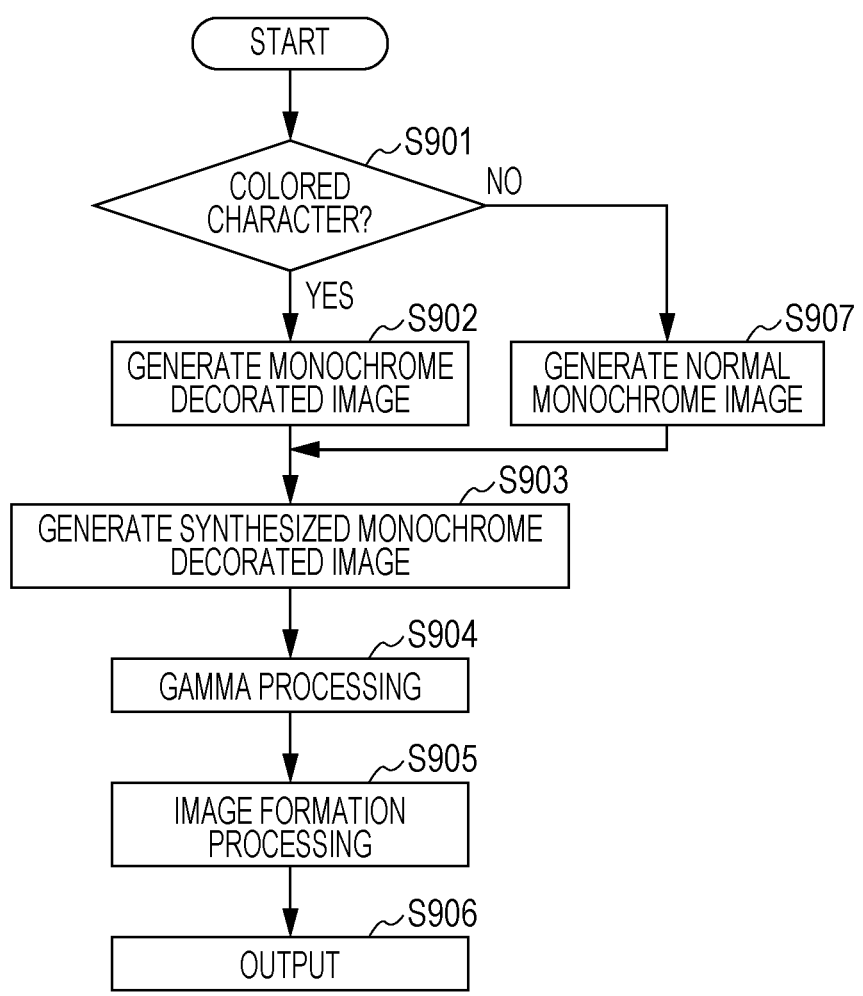
FIG. 9 is a flowchart illustrating an outline of the first embodiment.

Details of the processing of outputting color image data containing color text (color text data) when monochrome decoration output processing is set in the flowchart illustrated in FIG. 6 (the processing in step S608 in FIG. 6) will be described with reference to FIGS. 4, 5, and 9.

Figure 5:
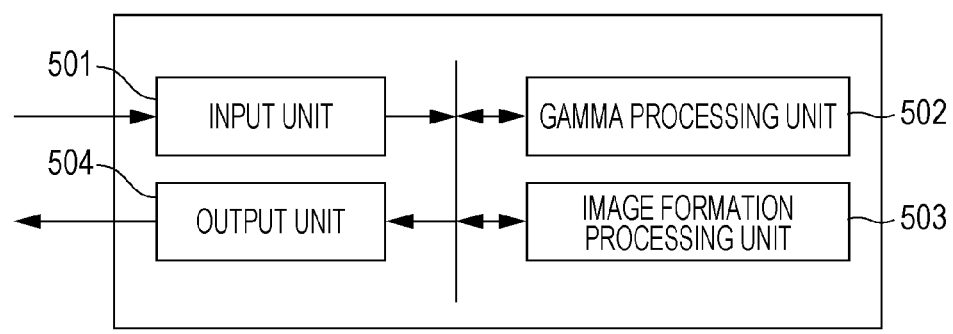
FIG. 5 is a block diagram illustrating an image processing unit.

FIG. 5 illustrates a configuration of the image processing unit 304 in the image processing apparatus 201 which includes an input unit 501, a gamma processing unit 502, an image forming processing unit 503, and an output unit 504. FIG. 9 is a flowchart involving processing to be performed by the components 402 to 404 included in the monochrome conversion processing unit 306 and the components 502 and 503 included in the image processing unit 304. The steps on this flowchart are implemented by the system control unit 302 in the image processing apparatus in accordance with a program stored in the ROM 303. The system control unit 302 includes a CPU, not illustrated.

First, image processing involved in monochrome decoration output will be described.

In step S901, the system control unit 302 causes the color text detecting unit 402 to detect color text (color text data) contained in subject color image data input through the input unit 401. If it is determined in step S901 to process a part excluding color text (part from which color text data is not detected) of the input color image data, the processing moves to step S907. In step S907, the system control unit 302 causes the normal monochrome processing unit 403 to perform normal monochrome processing on the subject data to create normal monochrome image data.

On the other hand, if it is determined in step S901 to process a part from which color text (color text data) is detected of the input color image data, the processing moves to step S902. In step S902, the system control unit 302 causes the monochrome decoration processing unit 404 to perform monochrome decoration processing on the subject data to create monochrome decoration image data.

Here, a combination of a color and a decoration pattern corresponding to the color determined in step S607 in FIG. 6 is selected.

For example, a monochrome decoration as shown on the monochrome decoration output material 106 in FIG. 1 may be given to the color text or around the color text to create monochrome decoration image data.

In step S903, the system control unit 302 transmits the normal monochrome image data created by the normal monochrome processing unit 403 and the monochrome decoration image data created by the monochrome decoration processing unit 404 to the monochrome image creating unit 407.

The monochrome image creating unit 407 combines data acquired by converting color text (color text data) of color image data to monochrome decoration image data and data acquired by converting a part excluding color text (data excluding color text data) to normal monochrome image data.

This results in combined monochrome decoration image data.

The combined monochrome decoration image data is transmitted from the monochrome conversion processing unit 306 to the image processing unit 304. Next, in step S904, the gamma processing unit 502 performs gamma processing on the combined monochrome decoration image data. Then in step S905, the image forming processing unit 503 performs image forming processing on the combined monochrome decoration image data having undergone the gamma processing to create monochrome decoration binary data. Then in step S906, the monochrome decoration binary data is transmitted to the printing unit 307, and the monochrome decoration binary data transmitted to the printing unit 307 is printed and output by using a black coloring material.

As described above, according to this embodiment, a decoration pattern that uses the smallest amount of black coloring material is selected for monochrome decoration output. This may inhibit an increase of the amount of black coloring material which may highly possibly increase in monochrome decoration output processing.

Second Embodiment

When the first embodiment is implemented, a decoration pattern to be given to a color text is sometimes desirably selected by a user. This case will be discussed with reference to a second embodiment.

Figure 10:
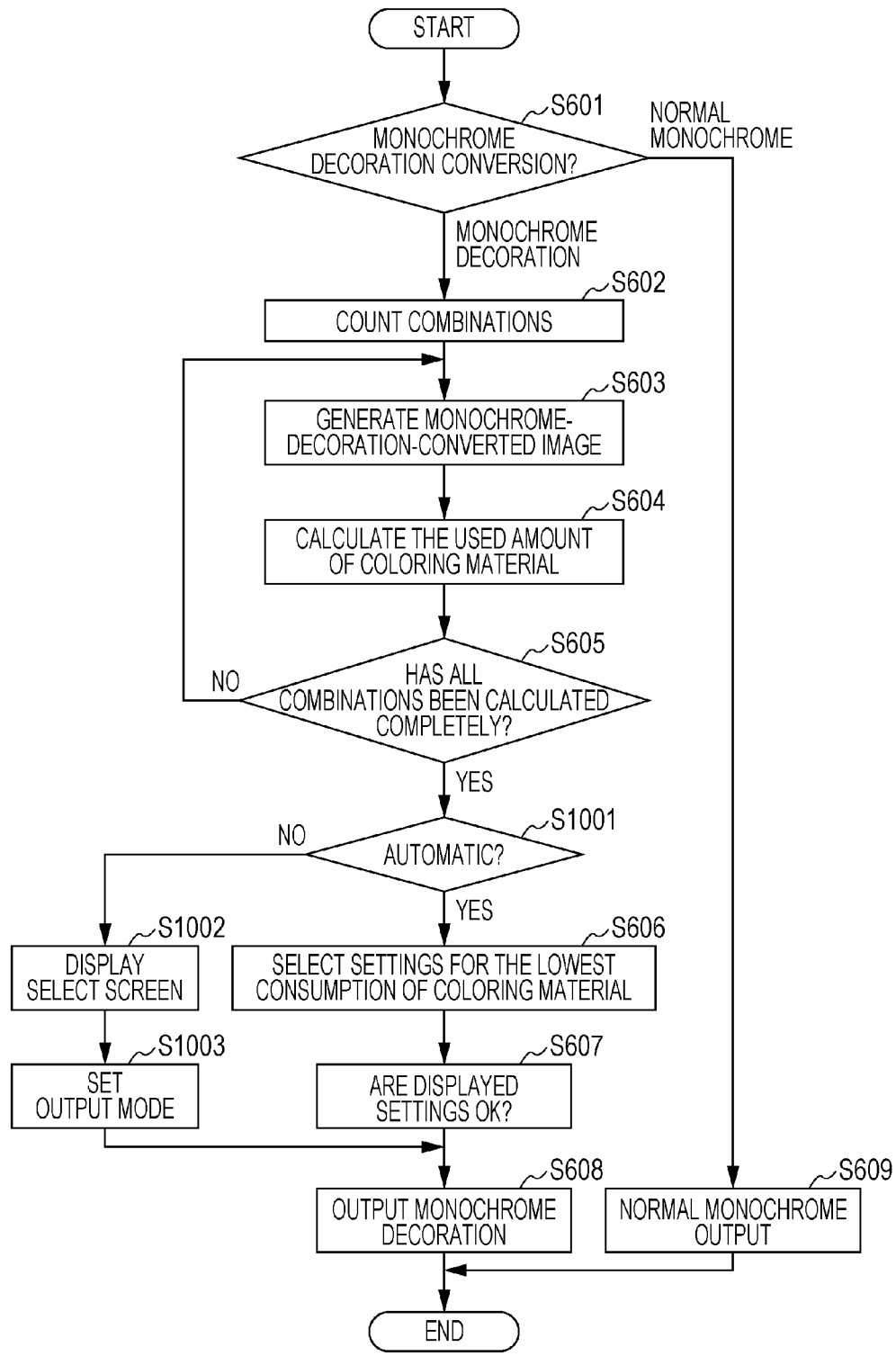
FIG. 10 is a flowchart illustrating an outline of a second embodiment.

FIG. 10 is a flowchart involving processing by the image processing unit 304, monochrome conversion processing unit 306, and monochrome decoration determining unit 405. The steps on this flowchart are implemented by the system control unit 302 in the image processing apparatus in accordance with a program stored in the ROM 303. The system control unit 302 includes a CPU, not illustrated.

Figure 11:
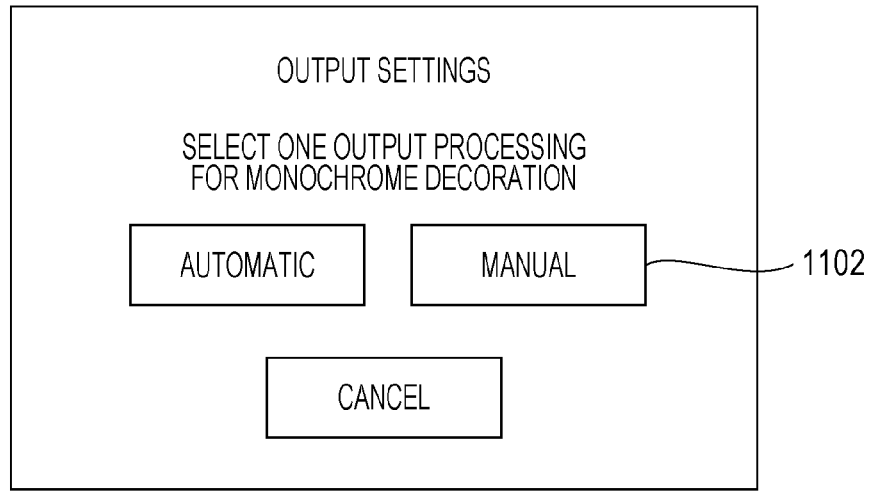
FIG. 11 illustrates an example displayed on a monitor or a UI screen.
Figure 12:
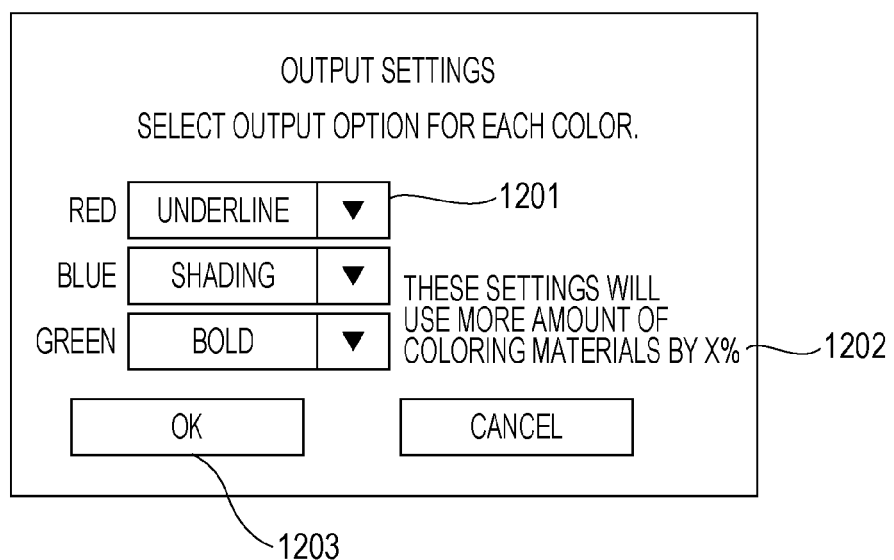
FIG. 12 illustrates an example displayed on a monitor or a UI screen.

FIGS. 11 and 12 illustrate examples of screens to be displayed on a monitor (not illustrated) of the host computer 202 or 203 or a display unit of the UI unit 305 in the image processing apparatus 201.

Because steps S601 to S609 in FIG. 10 are the same processing as in those of the first embodiment, the description will be omitted. Step S602 to S605 and step S606 may be replaced by step S1601 and step S1602, respectively, in FIG. 16.

In step S1001, the system control unit 302 acquires information on settings in a monochrome decoration output which are defined through the screen in FIG. 11 displayed on the UI unit 305 or a monitor of the host computer 202 or 203. The acquired information is transmitted to the monochrome decoration determining unit 405. If it is determined in step S1001 that automatic processing is selected, the same processing as that in the first embodiment is performed.

More specifically, a combination for the lowest total number of pixels contained in monochrome decoration image data or text data decorated in monochrome of monochrome decoration image data is selected from all combinations of colors and decoration patterns corresponding to the colors.

On the other hand, if it is determined that manual processing is selected, the processing moves to step S1002.

In step S1002, a screen as in FIG. 12 is displayed on the UI unit 305 or a monitor of the host computer 202 or 203 in which the printer driver is installed. The screen in FIG. 12 allows selection of a monochrome decoration pattern corresponding to each color text. When a pull-down button 1201 is pressed, a list of selectable monochrome decoration patterns is displayed. A user may select a desired monochrome decoration pattern. Choices for monochrome decoration patterns to be displayed first are combinations of color to be selected when the automatic processing is selected in step S1001 and decoration patterns corresponding to the colors.

Every time when the pull-down button 1201 is pressed and a monochrome decoration pattern is selected from the displayed list, a total number of pixels contained in the monochrome decoration image data or pixels contained in text data decorated in monochrome of the monochrome decoration image data is acquired.

On an area 1202, every time when a monochrome decoration output pattern is selected, an increased amount of coloring material is displayed.

The increased amount of coloring material will be described.

A total number of pixels contained in the monochrome decoration image data converted with a combination of a color displayed first and a decoration pattern corresponding to the color or pixels contained in text data decorated in monochrome of the monochrome decoration image data will be called a second total number of pixels.

Next, a total number of pixels contained in the monochrome decoration image data converted with a combination of a selected color and a decoration pattern corresponding to the color or pixels contained in text data decorated in monochrome of the monochrome decoration image data will be called a first total number of pixels.

From the first total number of pixels and the second total number of pixels, the corresponding first amount of coloring material and second amount of coloring material used for output are acquired. The first amount of coloring material and the second amount of coloring material are compared, and an increased amount of coloring material that is a difference indicating how much the first amount of coloring material is increased from the second amount of coloring material is displayed on the area 1202. Viewing this display, how much the amount of coloring material used for output will increase when monochrome decoration conversion is performed with a selected combination from the amount of coloring material used for monochrome decoration conversion with a combination using the smallest amount of coloring material for output may be determined.

In step S1002, when a button 1203 on the screen is pressed, the processing moves to step S1003. In step S1003, the system control unit 302 illustrated in FIG. 9 may cause the image processing unit 304 and monochrome conversion processing unit 306 to create monochrome decoration binary data with a combination of a selected color and a decoration pattern corresponding thereto.

As described above, according to this embodiment, a user may set a decoration pattern for each color text (color text data). A combination of a color and a decoration pattern corresponding to the color which uses the smallest amount of black coloring material for output may be compared with a combination of a color selected by a user and a pattern corresponding to the decoration color to clarify how much the amount of black coloring material will increase for output. This allows a user to set a combination of a color and a decoration pattern corresponding to the color in view of the increase.

Third Embodiment

A user desirably sets an upper limit of the amount of black coloring material available for monochrome decoration output when the first embodiment is implemented. This will be described according to a third embodiment.

Figure 13:
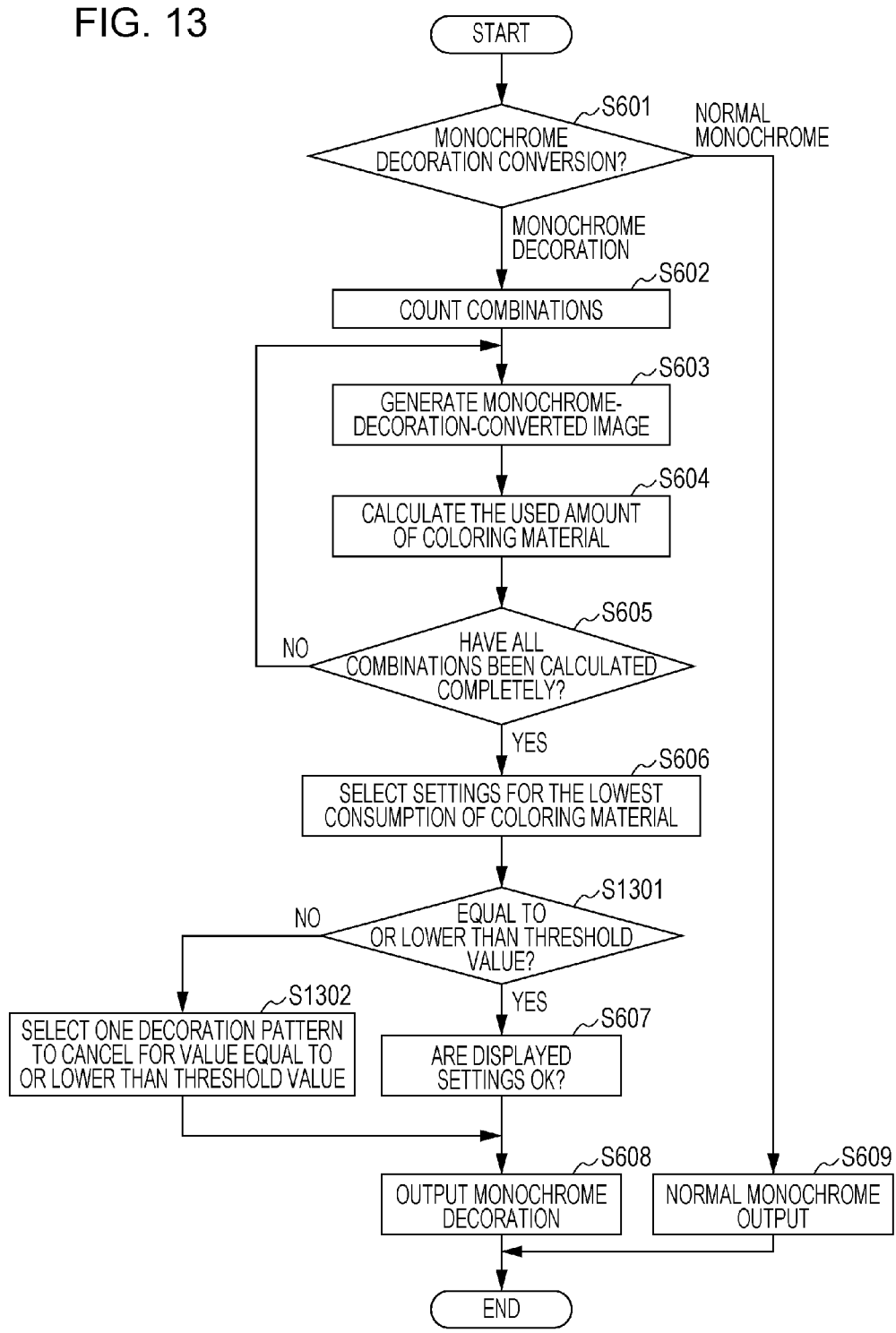
FIG. 13 is a flowchart illustrating an outline of a third embodiment.

FIG. 13 is a flowchart involving processing by the image processing unit 304, monochrome conversion processing unit 306, and monochrome decoration determining unit 405. The steps on this flowchart are implemented by the system control unit 302 in the image processing apparatus in accordance with a program stored in the ROM 303. The system control unit 302 includes a CPU, not illustrated.

Figure 14:
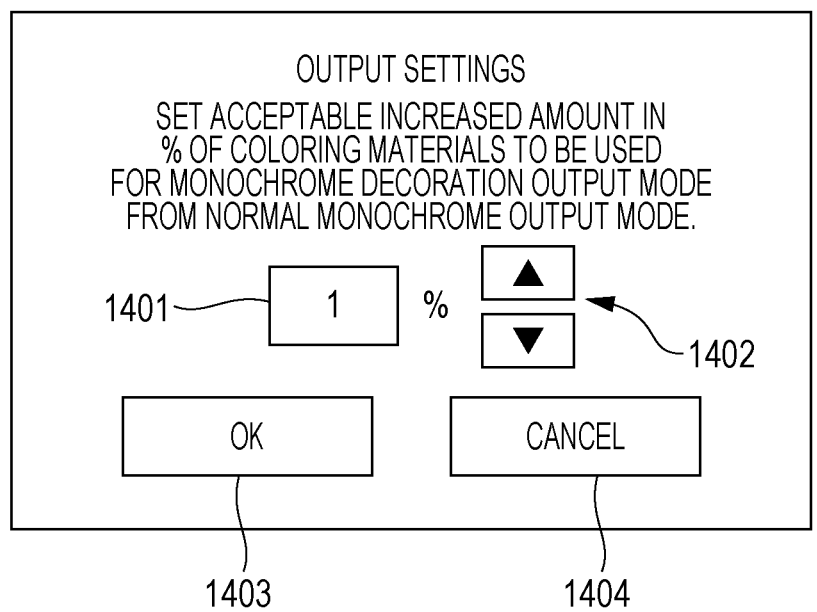
FIG. 14 illustrates an example displayed on a monitor or a UI screen.

FIG. 14 illustrates an example of a screen to be displayed on a monitor (not illustrated) of the host computer 202 or 203 or a display unit of the UI unit 305 in the image processing apparatus 201.

Because steps S601 to S609 in FIG. 13 are the same processing as in those of the first embodiment, the description will be omitted. Steps S602 to S606 may be replaced by steps S1601 and S1602 in FIG. 16.

In step S1301, the monochrome decoration determining unit 405 compares a threshold value representing an upper limit of the available amount of black coloring material and the amount of black coloring material used for output when monochrome decoration conversion is performed with a combination of the color selected in step S606 and the decoration pattern corresponding to the color.

The threshold value representing an upper limit of the amount of black coloring material is set by a user on the screen illustrated in FIG. 14. It may be preset in the image processing apparatus 201.

As a result of the comparison, if it is determined that the amount of black coloring material used for output is lower than the threshold value, the same processing as that of the first embodiment is performed.

More specifically, a combination which uses the lowest total number of pixels contained in monochrome decoration image data or text data with a monochrome decoration in monochrome decoration image data is selected from all combinations of colors and decoration patterns corresponding to the colors.

On the other hand, if it is determined in step S1301 that the amount of black coloring material used for output is equal to or higher than the threshold value, the monochrome decoration determining unit 405 in step S1302 determines that the combination for which the monochrome decoration conversion processing is to be cancelled for a lower amount of black coloring material used for output than the threshold value. The combination of a color (first color) and a decoration pattern (first decoration pattern) corresponding to the color which is determined for a smaller amount of black coloring material than the threshold value used for output when the monochrome decoration conversion processing thereon is cancelled.

For example, red text may correspond to a decoration pattern of an underline to text for monochrome-decoration output. In this case, if it is determined that a smaller amount of black coloring material than the threshold value may be acquired when the monochrome decoration with an underline is cancelled for monochrome decoration output, the monochrome decoration for red text is cancelled. Even when the monochrome decoration conversion with one of combinations of colors and decoration patterns corresponding to the colors is cancelled but the amount of black coloring material used for output is still equal to or higher than the threshold value, monochrome decoration conversion with a different combination is also cancelled. The combination to be cancelled here may be predetermined. For example, when monochrome decoration conversion on red text is cancelled and an amount of coloring material that is equal to or higher than the threshold value is used, monochrome decoration conversion on blue text may be predetermined to cancel. A user may be prompted to change the threshold value itself when cancelling monochrome conversion on text in all colors is required for a smaller amount of black coloring material used for output than the threshold value. Alternatively, an error notification may be given, or normal monochrome conversion is performed on the subject color image data.

After that, in step S608, the monochrome conversion processing unit 306 performs monochrome decoration processing for output, as described above.

Next, operations on a screen for determining a threshold value in FIG. 14 will be described. On an area 1401, a user acceptable amount of black coloring material used for monochrome decoration output is displayed.

An increase in amount of black coloring material is represented by a difference in "%" between the amount of black coloring material used for creating an monochrome converted normal monochrome output material 105 normally from the color document 101 and the amount of black coloring material used for creating a monochrome decoration output material 106 from the color document 101. A user may operate a button 1402 to increase or reduce the numerical value of the threshold. When a button 1403 is pressed, the designated threshold value is determined. When a button 1404 is pressed, the setting is cancelled.

As described above, when an increase in amount of black coloring material designated by a user is equal to or higher than the threshold value, monochrome decoration patterns may be cancelled one by one to acquire a smaller amount of coloring material than the threshold value for print output.

Fourth Embodiment

A user is desirably allowed to select how monochrome decoration conversion is to be cancelled for the reason that the amount of black coloring material used for monochrome decoration output is equal to or higher than an upper limit value of the usable amount of black coloring material according to the third embodiment. This will be described according to a fourth embodiment.

Figure 15:
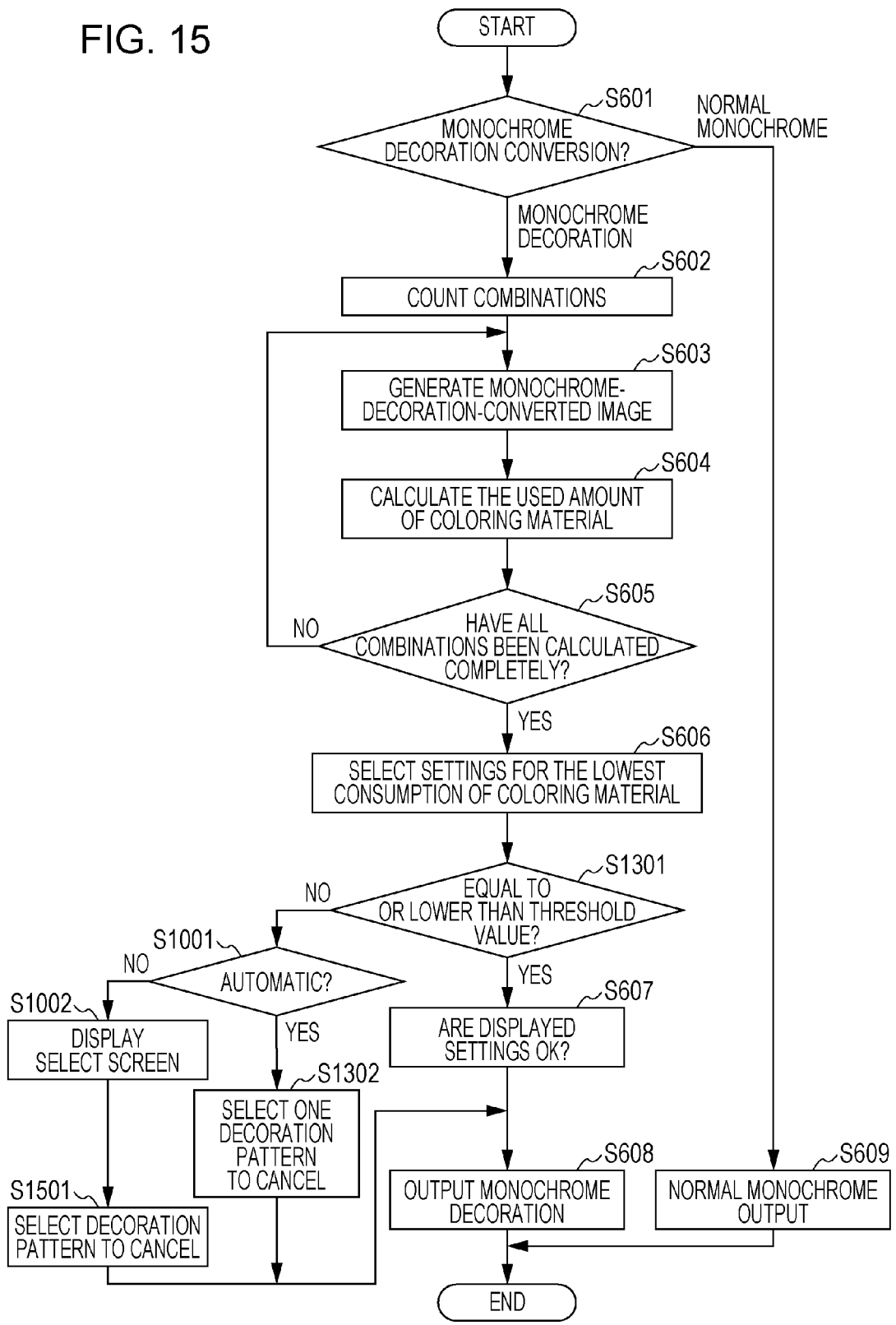
FIG. 15 is a flowchart illustrating an outline of a fourth embodiment.

FIG. 15 is a flowchart involving processing by the image processing unit 304, monochrome conversion processing unit 306, and monochrome decoration determining unit 405. The steps on this flowchart are implemented by the system control unit 302 in the image processing apparatus in accordance with a program stored in the ROM 303. The system control unit 302 includes a CPU, not illustrated.

Because steps S601 to S609 in FIG. 15 are the same processing as in those of the first embodiment, the description will be omitted.

Steps S602 to S606 may be replaced by steps S1601 and S1602 in FIG. 16.

If the amount of black coloring material used for monochrome conversion with the combination selected in step S606 is equal to or higher than the threshold value representing an upper limit value of the amount of black coloring material designated by a user on the area 1401 and the button 1102 is pressed, the processing moves to step S1002. In step S1002, the system control unit 302 displays a screen as in FIG. 12 on the UI unit 305 or a monitor of the host computer 202 or 203. By checking the area 1202, a user may press a pull-down button 1201 for color text for which unnecessity of monochrome decoration conversion is determined. Here, if a user selects "NONE", the processing moves to step S1501. In step S1501, the monochrome decoration determining unit 405 does not perform monochrome decoration conversion on the text with the color for which a user selects "NONE" as the corresponding decoration pattern.

After that, the monochrome conversion processing unit 306 performs monochrome decoration processing on text with a color excluding the color for which "NONE" is selected as the corresponding decoration pattern, and the printing unit 307 outputs the result.

As described above, a user is allowed to select a monochrome decoration pattern such that the amount of black coloring material usable for monochrome decoration output set by the user may be lower than a threshold value representing its upper limit.

Having described an electrophotography apparatus according to the embodiments, the present disclosure is applicable to an ink-jet printer, a thermal printer or the like, and the subject matter of the present disclosure is not limited by the type of printer. The coloring material to be used for printing may be toner, ink or other coloring materials, and the subject matter of the present disclosure is not limited by the type of coloring material.

According to the aforementioned embodiments, monochrome conversion processing is performed on color text (color text data) contained in color image data, the present disclosure is not limited thereto. For example, a graph showing colors contained in color image data may be used for monochrome conversion. In this case, monochrome decoration conversion may be performed on color data contained in color image data while normal monochrome conversion may be performed on data excluding color data contained in color image data.

Other Embodiments

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2012-251882, filed Nov. 16, 2012 which is hereby incorporated by reference herein in its entirety.

What is claimed is:

1. An image processing apparatus comprising:
a selection unit configured to select, in performance monochrome output on color image data, either a first monochrome output for outputting the color image data with decoration of patterns different for each color of the color data included in the color image data, or a second monochrome output for outputting the color image data without the decoration for the color data included in the color image data;
a determination unit which determines a combination of a color of color data having a highest number of pixels among colors of color data contained in the color image data, in a case where the selection unit selects performing the first monochrome output;
a decoration pattern having a lowest number of pixels among the decoration patterns; and
a monochrome decoration output unit which decorates color data contained in the color image data in accordance with a combination of a color and a decoration pattern corresponding to the color determined by the determination unit for the first monochrome output of the color image data,
wherein conversion of the color data in the color image data in accordance with the determined combination of a color and a decoration pattern is cancelled, if an amount of black coloring material used for performing the first monochrome output of the color image data in accordance with the determined combination is a predetermined amount or more larger than an amount of black coloring material used for performing the second monochrome output for the color image data.

2. The image processing apparatus according to claim 1, wherein an amount of coloring material used for performing the first monochrome output processing is acquired from a total number of pixels contained in monochrome decoration image data to be created for the first monochrome output of the color image data.

3. The image processing apparatus according to claim 1, wherein an amount of coloring material used for performing the first monochrome output processing is acquired from a total number of pixels contained in color data decorated in monochrome of monochrome decoration image data to be created for the first monochrome output of the color image data.

4. The image processing apparatus according to claim 1, further comprising a setting unit which allows setting of a combination of the color and a decoration pattern corresponding to the color through a display unit, wherein
a difference between
a first amount of coloring material that is an amount of coloring material used for the first monochrome output of the color image data by using the combination set by the setting unit; and
a second amount of coloring material that is an amount of coloring material used for the first monochrome output of the color image data by using the combination determined by the determination unit is displayed on the display unit.

5. An image processing the method comprising:
selecting, in performance monochrome output on color image data, either a first monochrome output for outputting the color image data with decoration of patterns different for each color of the color data included in the color image data, or a second monochrome output for outputting the color image data without the decoration for the color data included in the color image data; and
determining a combination of a color of color data having a highest number of pixels among colors of color data contained in the color image data, in a case where the selecting selects performing the first monochrome output, and a decoration pattern having a lowest number of pixels among the decoration patterns and decorating color data contained in the color image data in accordance with a combination of a color and a decoration pattern corresponding to the color determined by the determining for monochrome decoration output of the color image data,
wherein conversion of the color data in the color image data in accordance with the determined combination of a color and a decoration pattern is cancelled, if an amount of black coloring material used for performing the first monochrome output of the color image data in accordance with the determination combination is a predetermined amount or more larger than an amount of black coloring material used for performing the second monochrome output for the color image data.

6. A non-transitory storage medium storing a program that causes a computer to perform an image processing method comprising:
selecting, in performance monochrome output on color image data, either a first monochrome output for outputting the color image data with decoration of patterns different for each color of the color data included in the color image data, or a second monochrome output for outputting the color image data without the decoration for the color data included in the color image data;

determining a combination of a color of color data having a highest number of pixels among colors of color data contained in the color image data, in a case where the selecting selects performing the first monochrome output, and a decoration pattern having a lowest number of pixels among the decoration patterns and decorating color data contained in the color image data in accordance with a combination of a color and a decoration pattern corresponding to the color determined by the determining for monochrome decoration output of the color image data, wherein conversion of the color data in the color image data in accordance with the determined combination of a color and a decoration pattern is cancelled, if an amount of black coloring material used for performing the first monochrome output of the color image data in accordance with the determination combination is a predetermined amount or more larger than an amount of black coloring material used for performing the second monochrome output for the color image data.

* * * * *